Patented Mar. 21, 1939

2,151,137

UNITED STATES PATENT OFFICE 2,151,137

N-BUTYL MONOCHLOR-RESORCINOL

Eugene Moness, Long Island City, N. Y., assignor to E. R. Squibb & Sons, New York, N. Y., a corporation of New York No Drawing. Application September 15, 1934, Serial No. 744,173

3 Claims. (Cl. 260—623)

This invention relates to, and has for its object the provision of, halogenated straight-chain-alkyl resorcinols.

The compounds of this invention are the halogenated straight-chain-alkyl resorcinols having the general formula $C_6H_2(OH)_6RX$, wherein R represents a straight-chain-akyl and X represents a halogen. These compounds may be prepared by treating the corresponding alkyl resorcinols with the requisite quantity of a halogenating agent, care being preferably taken to eliminate conditions favoring oxidation.

Examples

Monochloro n-butyl resorcinol (probably having the formula 1,3-dihydroxy 4-n-butyl 6-chloro benzene) may be prepared as follows: 5 g. n-butyl resorcinol dissolved in 25 cc. glacial acetic acid is cooled in ice water, and 4.5 g. (a 10% excess) sulfuryl chloride dissolved in 10 cc. glacial acetic acid is added dropwise and with stirring; the liquid which has meantime changed from light yellow to dark red, is heated on the steam-bath for half an hour or until evolution of hydrogen chloride ceases, and, now almost black, is poured into water; an ether extract is made, washed with water, dried over anhydrous sodium sulfate, and shaken with charcoal; upon filtering, and distilling the ether from the light red solution so obtained, there remains a dark red, almost black, oil; being distilled at 140-145°/3 mm., almost all this oil comes over as a viscous reddish-yellow oil, which on standing becomes a soft crystalline semi-solid; dissolving in high-test gasoline with the aid of heating, crystallization by chilling with an ice-salt mixture, filtration, and drying, yields the desired compound as voluminous white crystals melting at 54–55°.

Pursuing the process of the preceding example, monochloro ethyl resorcinol, monochloro n-propyl resorcinol, monochloro n-amyl resorcinol, or monochloro n-hexyl resorcinol, may be obtained by substituting, respectively, for the n-butyl resorcinol and the sulfuryl chloride thereof: 5 g. ethyl resorcinol and 5.4 g. sulfuryl chloride; 5 g. n-propyl resorcinol and 4.9 g. sulfuryl chloride; 5 g. n-amyl resorcinol and 4.2 g. sulfuryl chloride; or 5 g. n-hexyl resorcinol and 3.8 g. sulfuryl chloride.

Halogenated straight-chain-akyl resorcinols of this invention are useful as antiseptics.

It is to be understood that the foregoing embodiments are merely illustrative and by no means limitative of the invention, which may assume various other forms—for instance, as to the particular alkyls present, the specific halogen introduced, and the reactants and procedures employed—within the scope of the appended claims.

I claim:

1. n-Butyl monochloro resorcinol.
2. 1,3-dihydroxy 4-n-butyl 6-chloro benzene.
3. The method of preparing n-butyl monochloro resorcinol that comprises treating n-butyl resorcinol with the requisite quantity of sulfuryl chloride.

EUGENE MONESS.